(12) United States Patent
Franz et al.

(10) Patent No.: US 6,178,401 B1
(45) Date of Patent: Jan. 23, 2001

(54) METHOD FOR REDUCING SEARCH COMPLEXITY IN A SPEECH RECOGNITION SYSTEM

(75) Inventors: Martin Franz, Yorktown Heights; Miroslav Novak, Mohegan Lake, both of NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/143,331

(22) Filed: Aug. 28, 1998

(51) Int. Cl.[7] .................................................. G10L 15/04
(52) U.S. Cl. ......................... 704/255; 704/238; 704/250
(58) Field of Search .................................. 704/200, 243, 704/255, 256, 9, 246, 247, 242, 252, 253, 231, 238, 239, 240, 249, 250

(56) References Cited

U.S. PATENT DOCUMENTS

| | | | |
|---|---|---|---|
| 5,444,617 | * 8/1995 | Merialdo | 704/9 |
| 5,884,259 | * 3/1999 | Bahl et al. | 704/252 |
| 5,897,616 | * 4/1999 | Kanevsky et al. | 704/246 |
| 5,963,905 | * 10/1999 | Novak et al. | 704/254 |
| 6,067,514 | * 5/2000 | Chen | 704/235 |

OTHER PUBLICATIONS

International Conference on Acoustics, Speech and Signal Processing. Dharanmipragada et al., "A fast vocabulary independent algorithm for spotting words in speech". pp. 233–236 vol. 1, May 1998.*

IBM Research Division. Bahl et al., "Matrix Fast Match: A fast method for identifying a short list of candidate words for decoding", pp. 345–348, May 1998.*

*A Fast Approximate Acoustic Match for Large Vocabulary Speech Recognition*, Bahl et al., IEEE Transactions on Speech and Audio Processing, vol. 1, No. 1, Jan. 1993, pp. 59–67.

*A Tree Search Strategy for Large–Vocabulary Continuous Speech Recognition*, Gopalakrishnan et al., IEEE, pp. 572–575.

* cited by examiner

Primary Examiner—Richemond Dorvil
(74) Attorney, Agent, or Firm—F. Chau & Associates, LLP

(57) ABSTRACT

A method is provided for reducing search complexity in a speech recognition system having a fast match, a detailed match, and a language model. Based on at least one predetermined variable, the fast match is optionally employed to generate candidate words and acoustic scores corresponding to the candidate words. The language model is employed to generate language model scores. The acoustic scores are combined with the language model scores and the combined scores are ranked to determine top ranking candidate words to be later processed by the detailed match, when the fast match is employed. The detailed match is employed to generate detailed match scores for the top ranking candidate words.

21 Claims, 2 Drawing Sheets

METHOD FOR REDUCING SEARCH COMPLEXITY IN A SPEECH RECOGNITION SYSTEM

BACKGROUND OF THE INVENTION

1. Technical Field

The present invention relates to speech recognition systems and, more particularly, to a method for reducing search complexity in a speech recognition system.

2. Discussion of Related Prior Art

A speech recognition system consists of the following three major components: an acoustic fast match; an acoustic detailed match; and a language model. The fast match is employed to construct a list of candidate words given the acoustic evidence and the language model is employed to similarly construct a list of candidate words given the word context. The list of candidate words are then ranked so that only the top ranking candidate words are processed by the more detailed, computationally expensive, and time consuming detailed match.

Since the fast match examines all the words in the vocabulary in order to construct the list of word candidates, the fast match represents one of the most computationally expensive components of the speech recognition system. Thus, it would be desirable and highly advantageous to provide a method for reducing the processing time of the fast match. Further, due to the more detailed evaluation performed by the detailed match, it would also be desirable and highly advantageous to provide a method for shortening the list of word candidates processed by the detailed match.

SUMMARY OF THE INVENTION

In one aspect of the invention, a method for reducing search complexity in a speech recognition system having a fast match, a detailed match, and a language model, comprises the steps of: optionally employing the fast match to generate candidate words and acoustic scores corresponding to the candidate words, based on at least one predetermined variable; employing the language model to generate language model scores; combining the acoustic scores with the language model scores and ranking the combined scores to determine top ranking candidate words to be later processed by the detailed match, when the fast match is employed; and employing the detailed match to generate detailed match scores for the top ranking candidate words.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENT

The present invention provides a method for reducing the use of the fast match component in a speech recognition system. The reduction is implemented in the case that the word context contains sufficient information to provide a reliable list of candidate words for the detailed match. The reduction is implemented in the case that the language model provides sufficiently reliable information to substantially reduce or completely eliminate the need of employing the fast match to construct a list of candidate words for use by the detailed match. That is, the reduction is employed when a word context contains sufficient information to provide a reliable list of candidate words for the detailed match.

By reducing the use of the fast match, the number of candidate words processed by the detailed match is also reduced. As a result, the method of the present invention advantageously increases the decoding speed of the speech recognition system.

Figure 1:
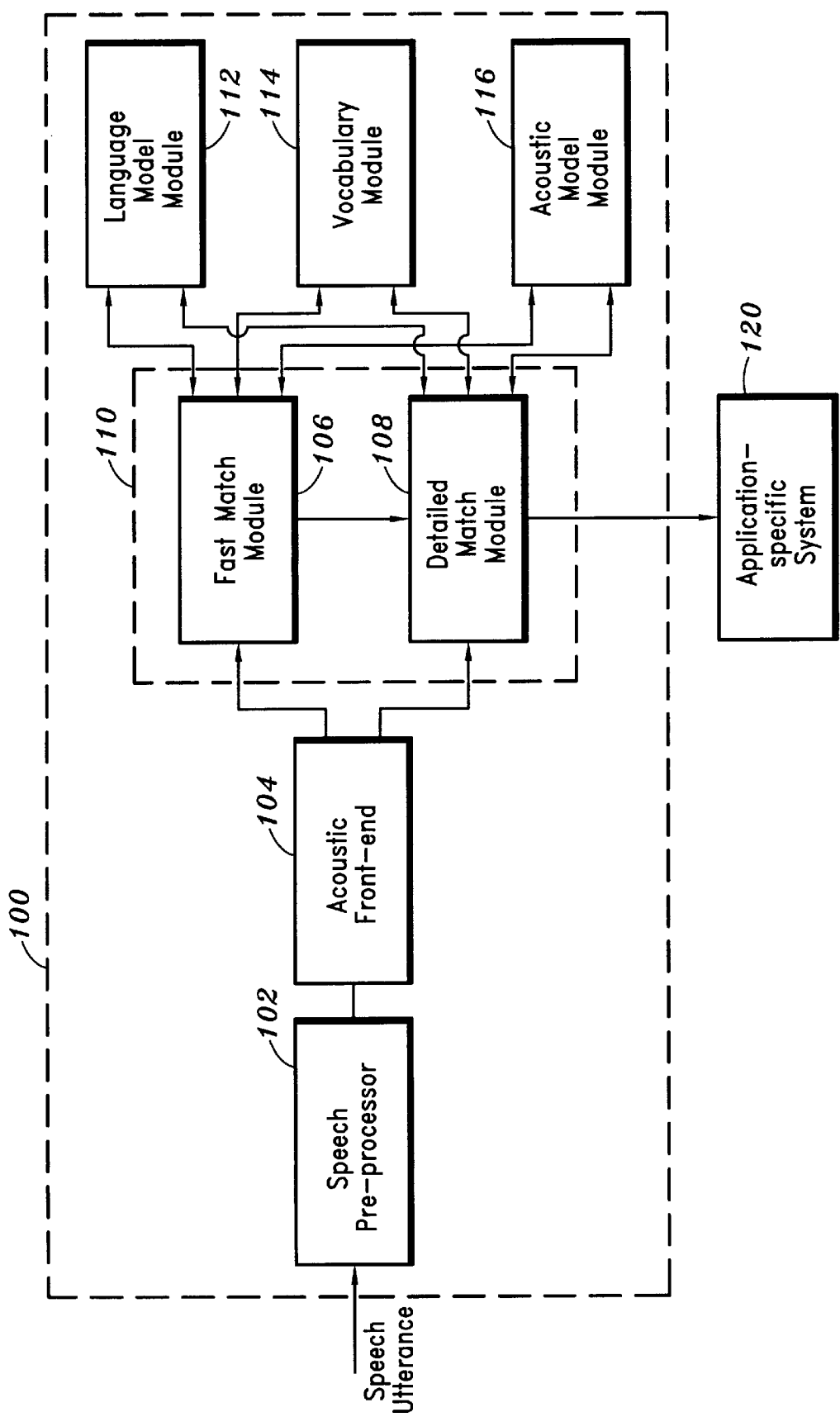
FIG. 1 is a block diagram of a speech recognition system to which the present invention is applied, in conjunction with an application-specific system.

Referring initially to FIG. 1, a block diagram is shown of a speech recognition system 100 to which the present invention is applied, in conjunction with an application-specific system 120. In FIG. 1, the speech recognition system 100 and its constituent components are described with respect to the conventional method for decoding an input utterance in order to output a representative text. While these same basic components are used to implement the method of the present invention, variations in the operation and use of the various components with respect to the present invention are described with reference to FIG. 2.

Returning to the description of FIG. 1, the speech recognition system 100 is operatively coupled to the application-specific system 120. The speech recognition system 100 includes a speech utterance pre-processor 102 operatively coupled to an acoustic front-end 104. The front-end 104 is also operatively coupled to a fast match module 106 and a detailed match module 108. The fast match module 106 and detailed match module 108, which are operatively coupled to each other, are collectively referred to as a decoder 110. A language model module 112 (hereinafter "language model"), a vocabulary module 114 (hereinafter "vocabulary"), and an acoustic model module 116 (hereinafter "acoustic model") are each operatively coupled to both the fast match module and the detailed match module.

It is to be appreciated that the present invention is usable with any speech recognition system and is not, in any way, limited to use with or dependent on any details or methodologies of any particular speech recognition arrangement. For instance, even generalized speech recognition systems such as the commercially available large vocabulary IBM ViaVoice or ViaVoice Gold systems may be employed in accordance with the invention. In any case, it should be understood that the elements illustrated in FIG. 1 may be implemented in various forms of hardware, software, or combinations thereof. As such, the main recognition elements (e.g., fast match module 106, detailed match module 108, language model 112, and acoustic model 116) are implemented in software on one or more appropriately programmed general purpose digital computers. Each general purpose digital computer may contain, for example, a central processing unit (CPU) operatively coupled to associated system memory, such as RAM, ROM and a mass storage device, via a computer interface bus. Accordingly, the software modules performing the functions described herein may be stored in ROM or mass storage and then loaded into RAM and executed by the CPU. As a result, FIG. 1 may be considered to include a suitable and preferred processor architecture for practicing the invention which may be achieved by programming the one or more general purpose processors. Of course, special purpose processors may be the invention provided herein, one of ordinary skill in the related art will be able to contemplate these and similar implementations of the elements of the invention.

A brief explanation of the functionality of the components of the speech recognition system 100 will now be given. The speech utterance pre-processor 102 receives the speech uttered by a speaker (spoken word sequence) and generates waveforms. The speech utterance pre-processor 102 may include an audio-to-analog transducer (microphone) and an analog-to-digital converter which respectively transduce the utterances into an electrical signal and then convert the electrical signal into a digital signal representative of the uttered speech. Further, the pre-processor may preferably sample the speech signal and partition the signal into overlapping frames so that each frame is discretely processed by the remainder of the system. The output signal of the pre-processor 102 is the sampled speech waveforms which are provided to an acoustic front-end 104. Alternatively, the acoustic front-end 104 may incorporate the functions of the pre-processor 102. The acoustic front-end 104, as is known in the art, generates feature vectors from the input utterance and labels from the feature vectors. The labels may be considered, in a general sense, to identify a corresponding phone. As is known, a phone is a basic unit of speech. It is to be appreciated that the pre-processor 102 and acoustic front-end 104 may be collectively referred to as an acoustic processor.

The speech recognition process is typically constrained by the acoustic model 116 which corresponds to the phones (basic units of speech) employed in the system 100, the vocabulary 114 which defines the vocabulary of the system in terms of these phones, and the language model 112 which specifies allowable sequences of vocabulary items.

The fast match module 106, which is based on the use of HMMs, is designed to examine all the words in the vocabulary and to reduce the number of candidate words (acoustically similar words) for a given string of incoming labels. That is, a list of candidate words is produced from the words in the vocabulary so that the number of words that require further processing is reduced. After the number of candidate words have been reduced by the fast match module, the contextual likelihoods associated with the language model are used to further reduce the number of candidate words. Then, the remaining candidate words are processed by detailed match module 108 in order to compute the likelihood of a segment of acoustics given a word model. The output of the decoder 110 is based on the results obtained by the detailed match module.

The decoded word(s) output from the decoder 110 are provided to the application-specific system 120. It is to be understood that the application-specific system 120 may be any system that employs the decoded speech signals as input. For example, the application-specific system 120 may be a telephone modem system whereby the spoken utterances received by the speech recognition system 100 represent text to be electronically forwarded to a remote location. The text could correspond to a speech by a newsworthy individual and the remote location could be a news service such as a newspaper. Of course, the above application is merely an example and, as such, the present invention is not intended to be limited thereby.

A more detailed explanation of the functionality of some of the components of the speech recognition system 100 will now be given. As is known, the acoustic model 116, which is built (trained) by analyzing speech samples of hundreds of speakers, consists of a collection of acoustic prototypes. Each prototype corresponds to a gaussian distribution of a set of feature vectors associated with a phone. When a segment of a speech is input to the speech recognition system 100, the acoustic front-end 104 examines the uttered speech in successive intervals and, based on which prototype (of the acoustic model) is closest by some measure to the feature values of the input speech, the label for the closest prototype is assigned to the interval. That is, based on the feature values generated during a centisecond interval, one prototype from a fixed set of prototypes is selected as the closest.

The vocabulary 114 is a table of words corresponding to an application of interest (e.g., general, medical, legal). Each word in the vocabulary is represented as a sequence of phones which are combined to form the pronunciation of the word. This sequence of phones is generally referred to as the baseform of a word. Examples of baseforms for given words may be:

| WORDS | PHONETIC DESCRIPTION |
|---|---|
| A | \|AX |
| ADAPTER | \|AX D AE PD T AXR |
| ADAPTERS | \|AX D AE PD T AXR Z |
| AGENT | \|EY JH AX N TD |
| AGENTS | \|EY JH AX N TS |
| ANALYSIS | \|AX N AE L AX S AX S |

The language model 112, which is built (trained) by analyzing a large text corpus (e.g., up to hundreds of millions of words), consists of a collection of conditional probabilities corresponding to the combining of words in the vocabulary. The task of the language model is to express the restrictions imposed on the way in which words can be combined to form sentences. Some of the most popular language models are n-gram models which make the assumption that the a priori probability of a word sequence can be decomposed into conditional probabilities of each word given the n words preceding it. In the context of n-gram language models, a trigram is a string of three consecutive words (denoted by $w_1\ w_2\ w_3$). Similarly, a bigram is a string of two consecutive words, and a unigram is a single word. The conditional probability of the trigram model may be expressed as follows: $Prob(w_3|w_2w_1)$.

As is known, before the decoder 110 performs the process of decoding using the feature vector signals provided by the acoustic front-end 104, the acoustic model 116 and the language model 112 need to be trained. The parameters (probabilities) of both these models are generally estimated from training data from the application of interest. In order to train the acoustic model, acoustic training data is provided by a proposed user of the system, as well as a transcription representative of the training data. The transcription may be input directly to the decoder 110 as text. Further, in order to train the language model, a transcription representative of typical sentences in the selected application domain is also provided to the decoder.

Generally, a trigram language model is trained using a transcription consisting of a large text corpus. The corpus consists of sentences, which nominally correspond to individual utterances that a speaker might produce in the context of a particular task. The training involves inputting the sentences and determining statistics for each word model in a manner which enhances the probability of the correct word relative to the probabilities associated with other words. As is known, such training provides counts for all trigrams, bigrams and unigrams identified in the corpus.

The count of a given n-gram is the number of occurrences of the given n-gram in the corpus (word frequency). In conventional n-gram language models, the text corpus is segmented into sentences before word frequencies are counted.

After segmentation, the first word of each sentence is deemed an "unconditional" word, which means that its probability of occurrence does not depend on any preceding words. Thus, in a conventional trigram language model, the first word of a sentence is considered a unigram. Words other than the first word of a sentence are deemed "conditional" words, which means that their probability of occurrence does depend on the words that precede them. Therefore, in a conventional trigram language model, the second word of a sentence may form a unigram or bigram, and any word after the second word of a sentence may form a unigram, bigram or trigram. As such, the training of the language model results in determining the likelihood of each ordered triplet of words, ordered pair of words, or single words in the vocabulary. From these likelihoods, a list of the most likely triplets of words and a list of the most likely pairs of words are formed. Additionally, the likelihood of a triplet not being in the triplet list and the likelihood of a pair not being in the pair list are determined.

The goal of the decoder 110 is to find the word sequence that has the maximum a posteriori probability given an observed acoustic input. Conventional approaches to this goal can be divided into two major groups, the synchronous search and the asynchronous search. The synchronous search is usually a form of the well known Viterbi algorithm. In the synchronous search, at each instance, all necessary computations are performed, so that the same time region of an utterance is never evaluated more than once. In the asynchronous search, for a given time region of the utterance, the search is performed by computation of the total acoustic score for each word in the vocabulary, one word at a time. Each of the two approaches has advantages and disadvantages.

By way of example, the invention will be described with reference to a popular asynchronous search scheme currently utilized in speech recognition systems, the envelope search, which is a tree-based search. Thus, a general description of the envelope search scheme will now be provided.

In sum, the envelope search utilizes a heuristic evaluation function which is related to the likelihood of a word sequence to order all hypothesized word sequences on a priority queue. In each iteration, the best hypothesized word sequence based on this heuristic evaluation function is selected and it is extended, generating more word sequence hypothesis. In order to compute the best complete path (word sequence) from the vocabulary, the envelope search scheme utilizes the fast match module to pre-select a small set of candidate words from the vocabulary which are acoustically similar to a word to be decoded and thus, have a high probability of including the correct word. Additionally, the detailed match module is used to compute the probability Prob(Y|w) for some segment of acoustics Y and a word w. Further, a trigram language model is used to evaluate the prior probability of a word sequence. Thus, in sum, candidate words are selected by the fast match, and the decoder outputs the final results on the basis of the language context and the likelihood calculated by the detailed match. For an in-depth discussion on the envelope search scheme, see "Modern Methods of Speech Processing", edited by Richard J. Mammone and Ravi P. Ramachandran, Kluwer Academic Publishers, (1995), and "A Tree-Search Strategy for Large-Vocabulary Continuous Speech Recognition", by Bahl et al., appearing in ICASSP, vol. 1, pp. 572–75 (1995).

The decoder 110 utilizes the fast and detailed match modules and the language model to search for the most likely sentence. As stated above, the search is based on a tree structure, where the set of all possible word sequences are organized into a word-level tree. The root node corresponds to the null word sequence and each branch in the tree corresponds to a word. Thus, each path starting at the root node corresponds to a sequence of words. Paths ending at terminal nodes of the tree correspond to complete sentences and paths ending at non-terminal nodes correspond to partial sentences. Given a sequence of acoustic observations, the search algorithm explores the tree and attempts to find the complete path having the highest score. The decoder maintains a dynamically changing list of partial paths (sequences of words) that have been explored thus far. During the search process the decoder also keeps track of the best path found thus far. Partial paths are designated as alive or dead and that status is re-evaluated in each iteration of the search. Further, in each iteration of the search, one of the alive partial paths is chosen for extension, and a candidate list of words is constructed for this path. Each word in the candidate list results in a new partial path which is one word longer than the chosen path. Each new partial path is compared to the best complete path and replaces the best complete path if it exhibits a higher likelihood. The search is terminated when there are no more partial paths that are alive. The best complete path is then output as the recognized sentence.

Thus, the state of the decoder 110 at a given time is characterized by a set of ordered paths, where each path is a partial sentence representing a particular amount of input speech. Let $w_1 \, w_2 \, \ldots \, w_i$ equal the sequence of words corresponding to a path $p_j$. The paths are ordered based on their likelihood which is obtained as $$l(p_j) = \text{Prob}(Y_1^k | w_1 \ldots w_i) * \text{Prob}(w_1 \ldots w_i) \quad (1)$$

where the first term is obtained from the acoustic match, $$Y_1^K$$

being the acoustic evidence covered by this partial sentence, and the second term is obtained from the language model.

The probability assigned by the language model to a subject word will now be described. When a subject word follows two words, a determination is made as to whether the subject word and the two preceding words are on the most likely triplet list described above with reference to the training of the language model. If so, the stored probability assigned to the triplet is indicated. If the subject word and its two predecessors are not on the triplet list, a determination is made as to whether the subject word and its adjacent predecessor are on the most likely pairs of words list described above. If so, the probability of the pair is multiplied by the probability of a triplet not being on the triplet list, and the product is assigned to the subject word. If the subject word and its predecessor(s) are not on the triplet list or pair list, the probability of the subject word alone is multiplied by the likelihood of a triplet not being on the most likely triplet list and by the probability of a pair not being on the most likely pair list. The product is assigned to the subject word.

Thus, the language model is used to enhance the probability of a correct word selection during the decoding process. This is because while most of the candidate words selected by the fast match module will be acoustically similar to the correct word, some of the candidate words may be removed from further consideration based on linguistics. For example, in the context of the following two words by the $(w_1\ w_2)$, the acoustic fast match list for the correct word way $(w_3)$ might include linguistically unlikely words such as say, ray, and may. Thus, for the partial path chosen for extension at each iteration of the search, the preceding words (e.g., by the) define the language model context.

It is to be appreciated that the technique of the envelope search is well known in the art and, as such, is not elaborated further herein. For further detail, see, for example, "Modern Methods of Speech Processing", edited by Richard J. Mammone and Ravi P. Ramachandran, Kluwer Academic Publishers, (1995), and "A Tree-Search Strategy for Large-Vocabulary Continuous Speech Recognition", by Bahl et al, appearing in ICASSP, vol. 1, pp. 572–75 (1995).

Figure 2:
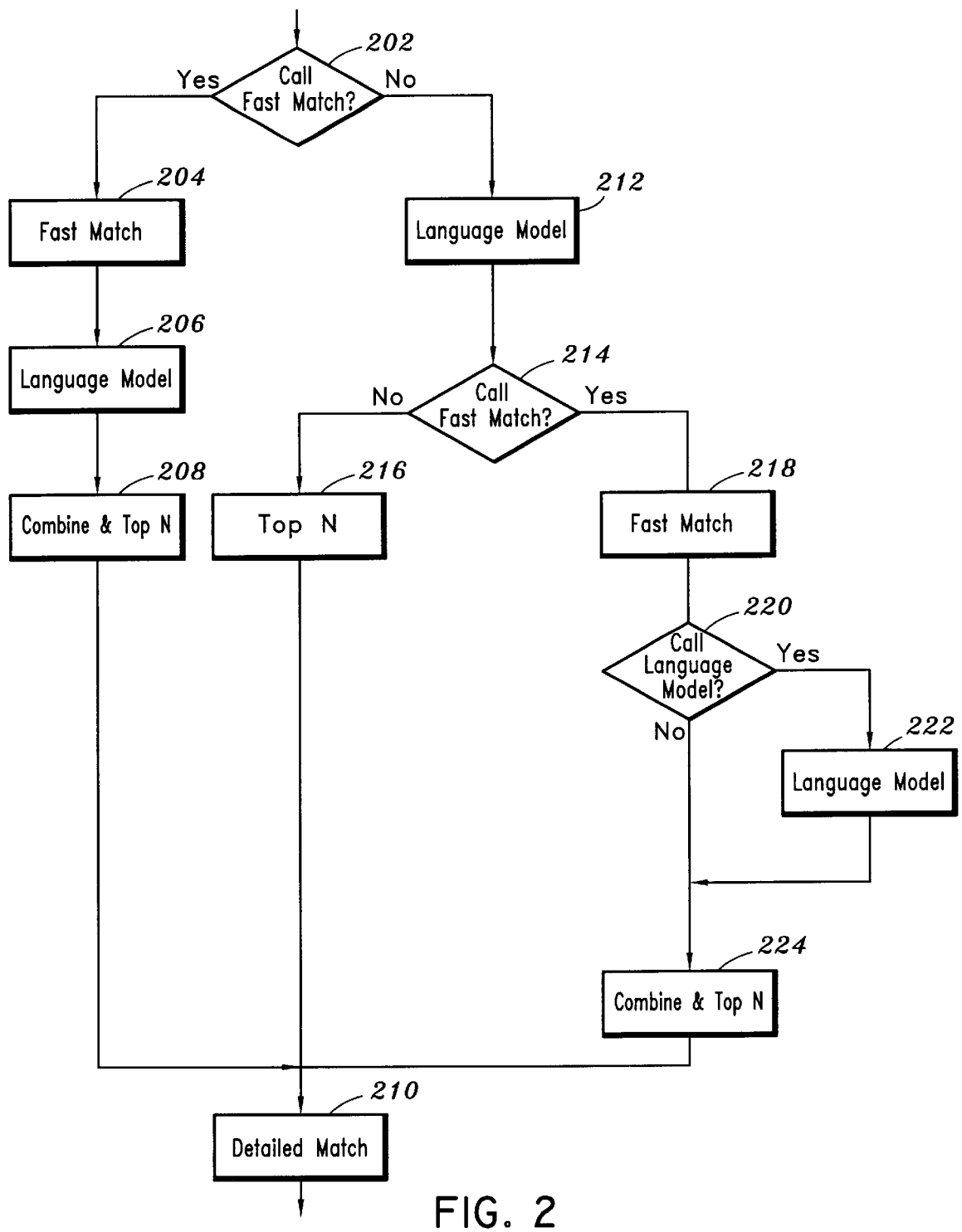
FIG. 2 is a flow chart illustrating one iteration of the decoding process of the speech recognition system of FIG. 1 according to an embodiment of the present invention.

Referring to FIG. 2, there is provided a method for reducing search complexity in a speech recognition system having a fast match, a detailed match, and a language model.

The method includes the step of determining whether or not to employ the fast match, based on variables corresponding to the current status of the various components of the decoder (step 202). Exemplary variables which may be considered include, for example: the distance from the beginning of the sentence; the words in the history (e.g., the previous words in the hypothesis); the fast match, language model, and detailed match scores of the words in the history; and the relation of the scores of the current path with respect to the other active paths. However, it is to be appreciated that the present invention is not limited to the above-described variables, and other variables may be utilized in accordance with the present invention.

If it is determined that the fast match is to be employed at step 202, then the fast match is employed to generate a list of candidate words and acoustic scores corresponding to the candidate words (step 204). The language model is then employed to generate language model scores for the candidate words previously generated by the fast match (step 206). The fast match and language model scores are combined and ranked to determine the top scoring candidates to be further processed by the detailed match (step 208). The detailed match is then performed (step 210).

If it is determined that the fast match is not to be employed at step 202, then the language model is employed to generate candidate words and language model scores corresponding to the candidate words (step 212). Next, it is determined whether or not to employ the fast match, based on the language model scores generated at step 212 together with the variables described with respect to step 202 (step 214). In general, the fast match is not employed when the word context contains sufficient information to provide a reliable list of candidate words for the detailed match. The language models scores may be evaluated in many different ways in the determination performed at step 214. For example, evaluations based on simple thresholding to complex models reflecting the shape of the curve of the language model scores may be employed. However, it is to be appreciated that the present invention is not limited to the above-described evaluation techniques, and other techniques may be utilized in accordance with the present invention.

If it is determined that the fast match is not to be employed at step 214, then the language model scores are ranked to determine the top scoring candidates to be further processed by the detailed match (step 216). Then, the detailed match is performed with respect to the top scoring words ranked at step 220 (step 210).

However, if it is determined that the fast match is to be employed at step 214, then the fast match is employed to generate candidate words and acoustic scores corresponding to the candidate words (step 218). Next, it is determined whether or not the language model is to be again employed, based on the language model scores generated at step 212 and the acoustic scores generated at step 218 (step 220). If so, then the language model is employed to generate language model scores corresponding to the candidate words generated by the fast match employed at step 218 (step 222).

The acoustic scores are combined with the language model scores to determine the top scoring candidates to be further processed by the detailed match (step 218). Preferably, the most recently generated language model scores are combined at step 218. Thus, if it determined that the language model is to be employed at step 220, then the language model scores generated at step 222 are combined with the acoustic scores. However, if it is determined that the language model is not to be employed at step 220, then the language model scores generated at step 212 are combined with the acoustic scores at step 224. The detailed match is then performed (step 210).

Thus, as described above, the present invention provides a method for reducing the use of the fast match component in a speech recognition system. By reducing the use of the fast match, the number of candidate words processed by the detailed match is also reduced. Accordingly, the method of the present invention advantageously increases the decoding speed of the speech recognition system. The resultant increased speed enables a speech recognition system implementing the method of the present invention to be utilized in applications where the slower speed of a conventional speech recognition system rendered the use of the conventional speech recognition system prohibitive.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for reducing search complexity in a speech recognition system having a fast match, a detailed match, and a language model, comprising the steps of:
   (a) optionally employing the fast match to generate candidate words and acoustic scores corresponding to the candidate words, based on at least one predetermined variable;
   (b) employing the language model to generate language model scores;
   (c) combining the acoustic scores with the language model scores and ranking the combined scores to determine top ranking candidate words to be later processed by the detailed match, when the fast match is employed; and
   (d) employing the detailed match to generate detailed match scores for the top ranking candidate words.

2. The method of claim 1, wherein the language model scores generated at step (b) correspond to the candidate words generated by the fast match at step (a), when the fast match is employed at step (a).

3. The method of claim 1, wherein said step (b) further comprises the step of generating candidate words corresponding to the language model scores, when the fast match is not employed, and the method further comprises the step of, before said step (d), ranking the language model scores to determine the top ranking candidate words to be later processed by the detailed match, when the fast match is not employed.

4. The method of claim 1, further comprising the steps of:
   (e) after said step (b) and before said step (c), optionally employing the fast match to generate the candidate words and the acoustic scores corresponding to the candidate words, based on the at least one predetermined variable and the language model scores generated at step (b); and (f) combining the acoustic scores of step (e) with the language model scores and ranking the combined scores to determine the top ranking candidate words to be later processed by the detailed match, when the fast match is employed at step (e).

5. The method of claim 4, further comprising the step of:

(g) after said step (e) and before said step (f), optionally employing the language model to generate language model scores, based on the language model scores generated at step (b) and the acoustic scores generated at step (e).

6. The method of claim 5, wherein said combining step (f) combines the language model scores generated at step (g) with the acoustic scores generated at step (e) to determine the top ranking candidate words to be later processed by the detailed match, when the language model is employed at said step (g).

7. The method of claim 5, wherein the language model is optionally employed at said step (g) based on a model reflecting a shape of a curve of the language model scores generated at said step (b).

8. The method of claim 5, wherein the language model is optionally employed at said step (g) based on whether the language model scores generated at said step (b) are above a predefined threshold.

9. The method of claim 4, wherein the fast match is employed at said step (e), when the at least one predetermined variable indicates that a word context does not contain sufficient information to provide the candidate words and the language model scores are below a predefined threshold.

10. The method of claim 1, wherein the at least one predetermined variable is a distance from a beginning of a sentence, words in a history, the acoustic, language model and detailed match scores generated from the fast match, the language model, and the detailed match, respectively, for the words in the history, and a relation of scores of a current path with respect to other active paths.

11. The method of claim 1, wherein the at least one predetermined variable corresponds to whether a word context contain sufficient information to provide the candidate words.

12. A method for reducing search complexity in a speech recognition system having a fast match, a detailed match, and a language model, comprising the steps of:

(a) optionally employing the fast match to generate candidate words and acoustic scores corresponding to the candidate words, based on at least one predetermined variable;

(b) employing the language model to generate language model scores;

(c) combining the acoustic scores with the language model scores and ranking the combined scores to determine top ranking candidate words to be later processed by the detailed match, when the fast match is employed;

(d) ranking the language model scores to determine the top ranking candidate words to be later processed by the detailed match, when the fast match is not employed; and (e) employing the detailed match to generate detailed match scores for the top ranking candidate words.

13. The method of claim 12, wherein the at least one predetermined variable is a distance from a beginning of a sentence, words in a history, the acoustic, language model and detailed match scores generated from the fast match, the language model, and the detailed match, respectively, for the words in the history, and a relation of scores of a current path with respect to other active paths.

14. The method of claim 12, wherein the at least one predetermined variable corresponds to whether a word context contain sufficient information to provide the candidate words.

15. A method for reducing search complexity in a speech recognition system having a fast match, a detailed match, and a language model, comprising the steps of:

(a) optionally employing the fast match to generate candidate words and acoustic scores corresponding to the candidate words, based on at least one predetermined variable;

(b) employing the language model to generate language model scores;

(c) optionally employing the fast match to generate the candidate words and the acoustic scores corresponding to the candidate words, based on the at least one predetermined variable and the language model scores, when the fast match is not employed at step (a);

(d) combining the acoustic scores generated at step (a) with the language model scores and ranking the combined scores to determine top ranking candidate words to be later processed by the detailed match, when the fast match is employed at step (a); and (e) combining the acoustic scores generated at step (c) with the language model scores and ranking the combined scores to determine top ranking candidate words to be later processed by the detailed match, when the fast match is employed at step (c); and (f) employing the detailed match to generate detailed match scores for the top ranking candidate words.

16. The method of claim 15, wherein the at least one predetermined variable is a distance from a beginning of a sentence, words in a history, the acoustic, language model and detailed match scores generated from the fast match, the language model, and the detailed match, respectively, for the words in the history, and a relation of scores of a current path with respect to other active paths.

17. The method of claim 15, wherein the at least one predetermined variable corresponds to whether a word context contain sufficient information to provide the candidate words.

18. The method of claim 15, further comprising the step of:

(g) after said step (c) and before said step (d), optionally employing the language model to generate language model scores, based on the language model scores generated at step (b) and the acoustic scores generated at step (c).

19. The method of claim 18, wherein said combining step (e) combines the language model scores generated at step (g) with the acoustic scores generated at step (c) to determine the top ranking candidate words to be later processed by the detailed match, when the language model is employed at said step (g).

20. The method of claim 18, wherein the language model is optionally employed at said step (g) based on a model reflecting a shape of a curve of the language model scores generated at said step (b).

21. The method of claim 18, wherein the language model is optionally employed at said step (g) based on whether the language model scores generated at said step (b) are above a predefined threshold.

* * * * *